United States Patent [19]
Kaneko et al.

[11] Patent Number: 5,917,657
[45] Date of Patent: Jun. 29, 1999

[54] IMAGING DEVICE HAVING FLEXIBLE LIQUID-FILLED FILM LENS

[76] Inventors: Takashi Kaneko; Hitoshi Kanayama, both of Nagoya; Takaharu Idogaki, Okazaki, all of Japan

[21] Appl. No.: 08/803,632

[22] Filed: Feb. 21, 1997

[30] Foreign Application Priority Data

Feb. 22, 1996 [JP] Japan .................................. 8-034883

[51] Int. Cl.$^6$ .................................................. G02B 21/02
[52] U.S. Cl. ........................... 359/661; 359/665; 359/462
[58] Field of Search .................................... 359/666, 665, 359/661, 656, 478, 462, 847; 396/72

[56] References Cited

U.S. PATENT DOCUMENTS

| | | | |
|---|---|---|---|
| 3,493,290 | 2/1970 | Traub ...................................... | 359/479 |
| 3,632,184 | 1/1972 | King ........................................ | 359/365 |
| 4,802,746 | 2/1989 | Baba et al. .............................. | 359/667 |
| 4,834,512 | 5/1989 | Austin ..................................... | 359/666 |
| 5,124,842 | 6/1992 | Honda et al. . | |
| 5,148,502 | 9/1992 | Tsujiuchi et al. . | |

FOREIGN PATENT DOCUMENTS 2389144  12/1978  France .

| | | |
|---|---|---|
| 60-101501 | 6/1985 | Japan . |
| 63-180901 | 7/1988 | Japan . |
| 6-311411 | 11/1994 | Japan . |
| 8-114703 | 5/1996 | Japan . |

OTHER PUBLICATIONS

Shiraishi et al: Image Processing System for Expanding Depth of Focus of Optical Microscope–Composition of Expanded Depth of Focus Image and Three Dimensional Expression of Shape–vol. 60, No. 8, 1994, (See English abstract).

*Primary Examiner*—Georgia Epps
*Assistant Examiner*—Jordan M. Schwartz

[57] ABSTRACT

A camera includes a device for variably focusing and condensing an image on an optical light. The camera includes a lens in which a clear liquid is disposed between opposing transparent elastic films. Pressure is externally applied to one of the films at a predetermined position, thereby changing the ratio of curvature of the transparent elastic film. This changes the focal length of the lens, thereby producing an image wherein all positions are in focus due to the persistence of vision effect of human vision.

13 Claims, 5 Drawing Sheets

IMAGING DEVICE HAVING FLEXIBLE LIQUID-FILLED FILM LENS

BACKGROUND OF THE INVENTION

1. Field of the Invention

This invention relates to an optical imaging apparatus; more particularly, the invention relates to a microscope and a microscope camera using such a microscope.

2. Description of Related Art

Conventionally, optical microscopes and microscope cameras provided with a magnifying optical system have been employed to view minute bodies. Because the depth of field of an object becomes shallower as the magnification factor is increased in such systems, assembly and inspection of minute, three-dimensional components of micromachines, which have been the subject of much research in recent years, is difficult.

A method for enlarging the depth of field in an optical microscope is disclosed in Japanese Laid-Open Patent Publication No. Hei 2-192276, where an image obtained while scanning using an objective lens of a microscope in the height direction is stored in memory and the image is reconstructed by image processing.

However, this method requires a structure to move the objective lens over a large movement distance as well as devices for performing image storage and image processing, and a long time may be needed for image processing.

Additionally, electron microscopes, laser microscopes, and the like have been put to practical use as another method of microscope inspection with a large depth of field. However, because an electron microscope presupposes viewing within a vacuum chamber, utilization in assembly tasks and the like is difficult. Furthermore, although a laser microscope can obtain a high-resolution image with large depth of field even in an atmosphere, laser beam scanning and the like require a sophisticated and complex structure.

SUMMARY OF THE INVENTION

In view of the above-described problems of the prior art, an object of the present invention is to provide an optical imaging system which has an enlarged depth of field. It is another object of the present invention to provide an optical imaging apparatus having a large depth of field due to high-speed oscillation of a focal plane of an objective lens thereof.

To achieve the foregoing object, a first aspect of the present invention provides a camera apparatus for viewing an object image, a device for variably focusing and condensing light on an optical light path where an object image is formed including a lens configuration where a clear liquid is sealed in an interior space thereof; and a unit for imparting a cyclical pressure change in which a latent image is produced in the clear liquid from a position external thereto, thereby causing a ratio of curvature of the transparent elastic film to be changed, thereby producing an image having a high contrast portion based on a plurality of images obtained by causing a focal length of the variable focusing and condensing device to be changed.

Consequently, it is possible to view in real time an image in focus at locations over the entirety of the body wherein solely a high contrast portion is evoked as a latent image by causing the focal length of the optical system (i.e., the objective lens) to be varied.

Another aspect of the present invention provides a camera apparatus having an objective lens employing one or more variable focus lenses for deforming a transparent elastic film having a desired spherical or aspherical shape due to a previously established film thickness profile which is joined at a location opposite a receptacle having a clear liquid sealed therein, where a radius of curvature of the transparent elastic films are changed by controlling the pressure of the clear liquid, thereby changing the focal length of the lenses; a pumping device for applying pressure to the clear liquid; a sensor for converting an image formed by the objective lens into electrical signals; and a display device for displaying electrical signals from the pickup device as an image.

Consequently, the depth of field of the variable focus lens is enlarged by causing the object-side focal position of the variable focus lens to be cyclically varied.

The pumping device may impart a cyclical pressure change of not less than a speed imparting a visually latent image to the clear liquid of the variable condensing lens.

Consequently, the object-side focal plane of the objective lens oscillates more rapidly than the frequency (approximately 60 Hz) at which human vision produces persistent images, only the portion in focus is overlaid as a latent image, and the viewer perceives an image where all locations are in overall focus.

The variable focus lens may have a variable focus lens sealing a clear liquid between a transparent elastic film having a predetermined film thickness profile and a compressible elastic film for controlling pressure of the liquid so that the curvature of the single transparent elastic film is changed, thereby varying the focal length of the lens, and an actuator to control pressure applied to the clear liquid by pressing or drawing the elastic.

Consequently, by employing an actuator having a fast response time, such as a piezoelectric element, and controlling the pressure of the enclosed clear liquid, this variable focus lens can vary the location of the focal plane rapidly and within a wide range.

Another aspect of the present invention provides a camera apparatus wherein depth of field is enlarged by a latent image on a pixel by causing an object-side focal position of the objective lens to be changed with a period shorter than a period allowing a pickup element to read an image signal of a pixel.

Consequently, by oscillating the object-side focal plane of the objective lens with a period shorter than a period allowing the pickup element to read an image signal of a pixel, a latent image effect is produced in the pickup element and an image for which the respective locations of the object are in focus is overlaid, and the image is captured. When this captured image is displayed on a television monitor, due to a difference in contrast between areas in focus and areas out of focus on the object, the viewer can perceive an image where the entire object is in focus.

Another aspect of the present invention provides a stereoscopic camera having two or more cameras with a parallax angle therebetween, and a display for restoring and playing back images obtained using the cameras as stereoscopic images.

Consequently, an observer views the image obtained by the right-hand camera apparatus with the right eye and views the image obtained by the left-hand camera apparatus with the left eye, and it becomes possible to see a stereoscopic image wherein all locations of the object are in focus.

According to this invention, as was described in detail hereinabove, it is possible to greatly enlarge depth of field of a camera and view in real time an image in focus at locations over the entire object by reciprocating a focal plane of a variable focus lens incorporated in an objective lens at high speed with a cycle at which a latent image effect occurs in human vision or occurs in an image pickup element, particularly in a camera apparatus for magnification and viewing of minute objects, such as a microscope camera.

Furthermore, by employing two or more camera units with enlarged depth of field, stereoscopic viewing also becomes possible, and realistic images can be perceived when handling microscopic objects.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A mode of embodiment of this invention will be described hereinafter with reference to the drawings.

Figure 1:
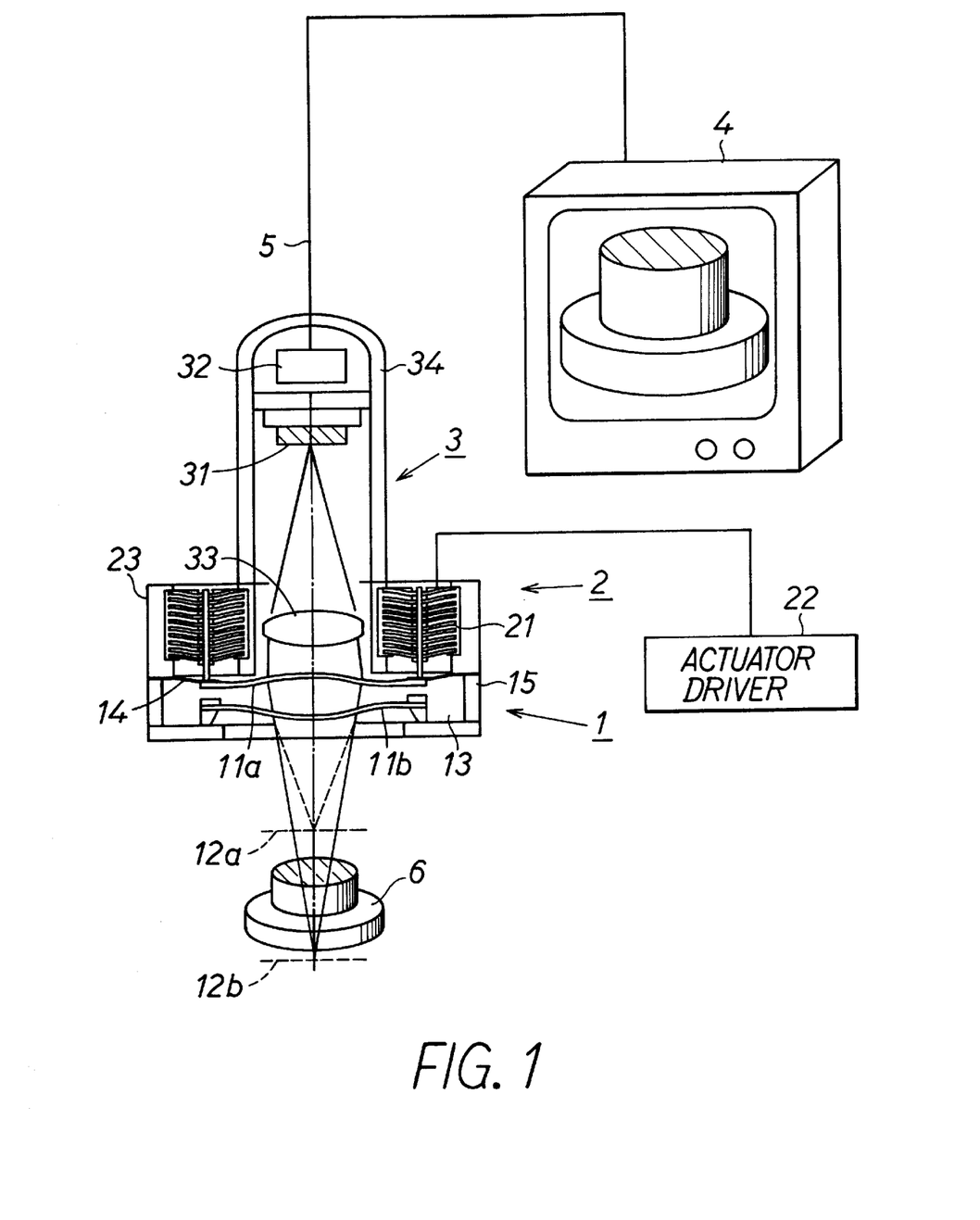
FIG. 1 shows a camera apparatus according to a first preferred embodiment of the present invention.

FIG. 1 shows a camera apparatus according to a first preferred embodiment of the present invention which is made up of a variable focus lens portion 1, an actuator portion 2 (described in greater detail below) for driving transparent elastic films 11a and 11b of the variable focus lens 1, a CCD camera 3 for performing photoelectric conversion for images formed by the lens system, a television monitor 4 for displaying photoelectrically converted video signals as images, and a video signal cable 5 for connecting the CCD camera 3 and the television monitor 4.

Figure 2:
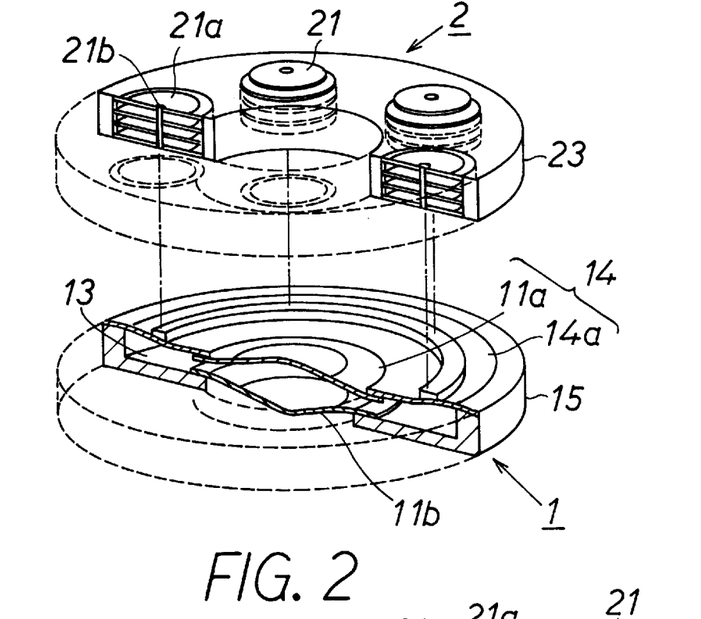
FIG. 2 is a perspective sectional structure of a variable focus lens including a variable focus lens portion and an actuator portion incorporated in the objective lens of the camera apparatus shown in FIG. 1.
Figure 3:
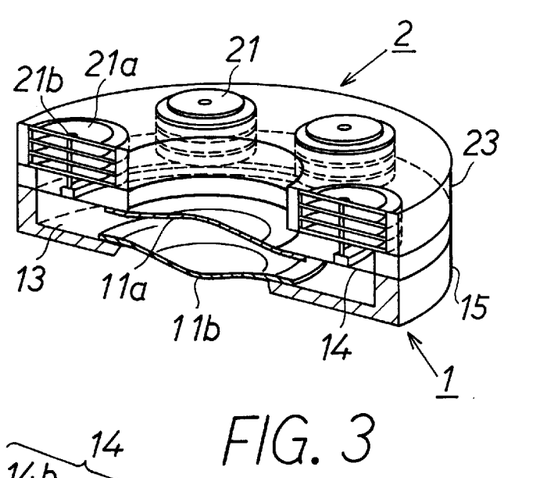
FIGS. 3 and 4 are examples of the variable focus lens of FIG. 2.

As shown in FIGS. 2 and 3, the variable focus lens portion 1 which serves as the objective lens overlaps with the actuator portion 2, and includes transparent elastic films 11a and 11b, clear operating fluid 13 sealed within a container 15, and an elastic film 14.

The container 15 has an open-ended cylindrical shape, with an open portion in the center of the bottom thereof. The transparent elastic film 11b blocks this open portion. On the upper side, the elastic film 14 made up of a donut-shaped elastic film 14a and a transparent elastic film 11a blocking a hole in a central portion of film 14a is fixedly mounted using an O-ring and sealing material so that it is parallel to the bottom of the container 15.

Figure 4:
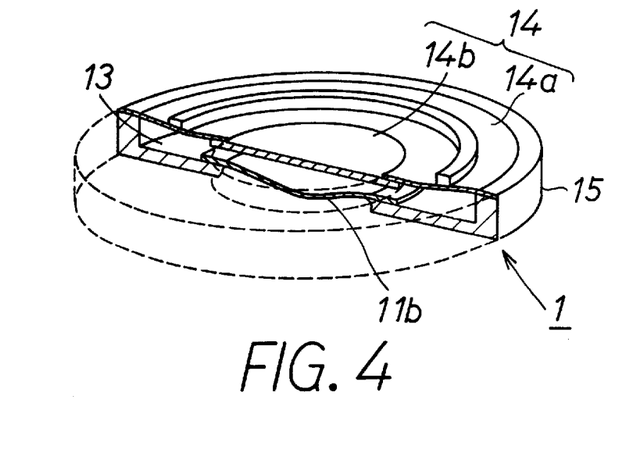
Figure 7:
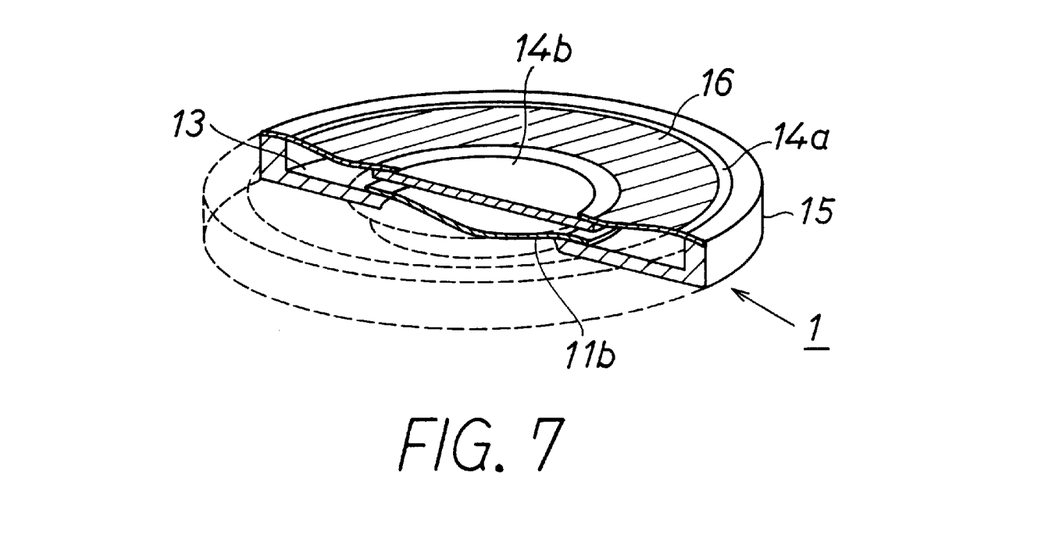
FIG. 7 shows another variable focus lens according to the first embodiment.

The transparent elastic film 11a and the transparent elastic film 11b oppose one another, and the respective transparent elastic films 11a and 11b are fixed and sealed airtightly to the elastic film 14a and the container and are disposed so that the clear operating fluid sealed in the interior thereof does not leak. In this embodiment, two transparent elastic films 11a and 11b are employed to form a variable focus lens, but it is possible for the central portion of the elastic film 14a also to utilize a transparent plate 14b made up of a parallel-planar configuration or a fixed lens configuration, as shown in FIG. 4. In FIGS. 4 and 7, a similar effect is obtained even when the transparent elastic film 11a and the transparent plate 14b are interchanged.

Figure 5:
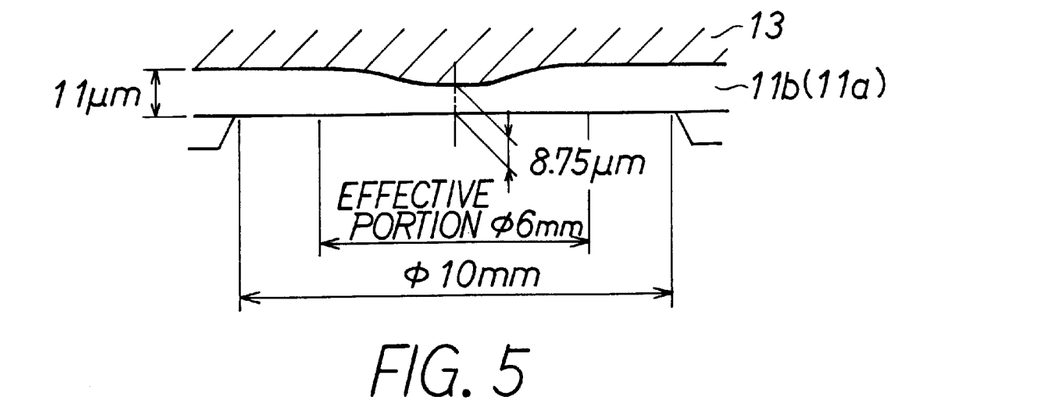
FIG. 5 shows a transparent diaphragm having a film thickness profile configuration employed in the variable focus lens shown in FIG. 2.

In this embodiment, the film thickness profile of the transparent elastic films 11a and 11b is set as shown in FIG. 5. This film thickness profile is established by methods disclosed in Japanese Patent Publication Laid-Open No. Hei 8-114703, and description thereof will be omitted for brevity. By providing this film thickness profile, the curved surface which deforms in a case where pressure is received from the clear operating fluid 13 becomes a spherical or aspherical surface which is useful as an optical element, and optical characteristics of the variable focus lens are improved.

Accordingly, because the focal length of the variable focus lens portion 1 is to be reciprocated at high speed, the actuator portion 2 is disposed on a periphery of the lens to overlap the elastic film 14a, as shown in FIG. 3, and the elastic film 14a is pressed by an actuator 21 of the actuator portion 2.

Figure 6A:
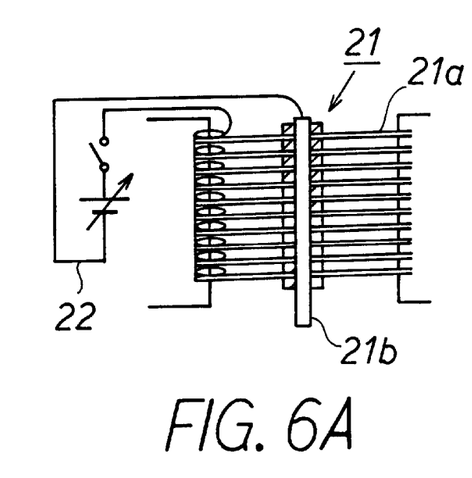
FIGS. 6A and 6B show the operation of a pressure-laminate type piezoelectric unimorph actuator for driving a variable focus lens in the above embodiments.

As shown in FIG. 6A, the actuator 21 is a pressure-laminate type piezoelectric unimorph element made up of a piezoelectric unimorph element 21a bonding a elastic plate such as a thin metal sheet to a piezoelectric element, and an output shaft 21b fixed at the central portion of the piezoelectric unimorph element 21a.

Figure 6B:
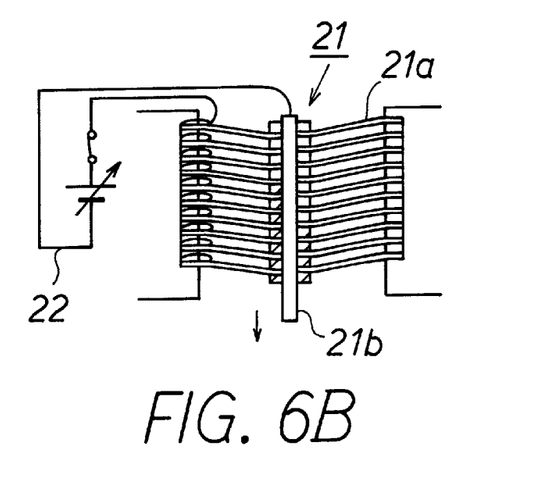

The central portion of this piezoelectric unimorph element 21a is displaced as shown in FIG. 6B by application of voltage from an actuator driver 22 made up of an oscillator and amplifier shown in FIG. 1. Force generated by the piezoelectric unimorph element 21a is concentrated on the output shaft 21b at the central portion thereof so that an overall required amount of displacement and generated force of the actuator 21 is obtained. The actuator portion 2 is connected to one side of the variable focus lens 1 as shown in FIG. 3, and the output shaft 21b is engaged with the elastic film 14 as shown in FIG. 3.

In this embodiment, to alleviate the load on the actuator 21, a plurality of actuators 21 are disposed within an actuator case 23. Furthermore, this actuator is not exclusively limited to the above-described piezoelectric unimorph element; it need only produce the generated force and amount of displacement required by the variable focus lens.

It is also possible that the actuator portion 2 is integral with the variable focus lens portion 1 as shown in FIG. 7. That is, a piezoelectric element 16 may be bonded to the elastic film to form a piezoelectric unimorph structure. By applying a voltage to this structure, the elastic film 14a is flexed by displacement of the piezoelectric element 16, and the clear operating fluid 13 can be compressed.

Accordingly, as shown in FIG. 1, the CCD camera 3 is disposed on a rear stage of the variable focus lens portion 1, and the image formed by the lens system is picked up.

This CCD camera 3 is made up of a CCD element 31, a CCD element driver 32, one or more fixed lenses 33 to augment the optical characteristics of the variable focus lens portion 1, and a lens barrel 34. The CCD camera 3 in this embodiment converts an image formed on the CCD element 31 by the variable focus lens portion 1 and the fixed lens 33 serving as the lens system to video signals of NTSC format or the like. This CCD camera 3 may use an image pickup element other than a CCD camera, such as an image pickup tube.

Video signals output from the CCD camera 3 are carried by the video signal cable and input to the television monitor 4. The television monitor 4 displays the images picked up by the CCD camera 3, and the displayed images are seen by the user.

With the camera apparatus according to this embodiment, a focal plane 12 of the variable focus lens portion 1 is continuously varied in an interval between focal lengths 12a and 12b encompassing an object 6 at a cycle of 60 Hz or more. In the image of the object 6 picked up by the CCD element and displayed on the television monitor 4 at this time, portions in focus are high in contrast whereas portions not in focus are low in contrast.

Consequently, due to the persistence of vision, the high-contrast portions remain in the eye. Accordingly, it becomes possible for the viewer to see an image wherein all locations of the object 6 are in focus.

Additionally, as another method of operation, the CCD element 31 is able to pick up at least once a focused image overlapping the entire image pickup plane of the object 6 by causing the focal plane 12 of the variable focus lens portion 1 to be changed with a cycle shorter than the cycle with which a CCD element drive circuit 32 reads charges stored in pixels of the CCD element 31. Accordingly, when the viewer views on the television monitor 4 the images picked up by the CCD element 31, portions in focus are high-contrast and portions out of focus are low-contrast, and so overall it is possible to view all portions in focus due to the difference in contrast.

Figure 8:
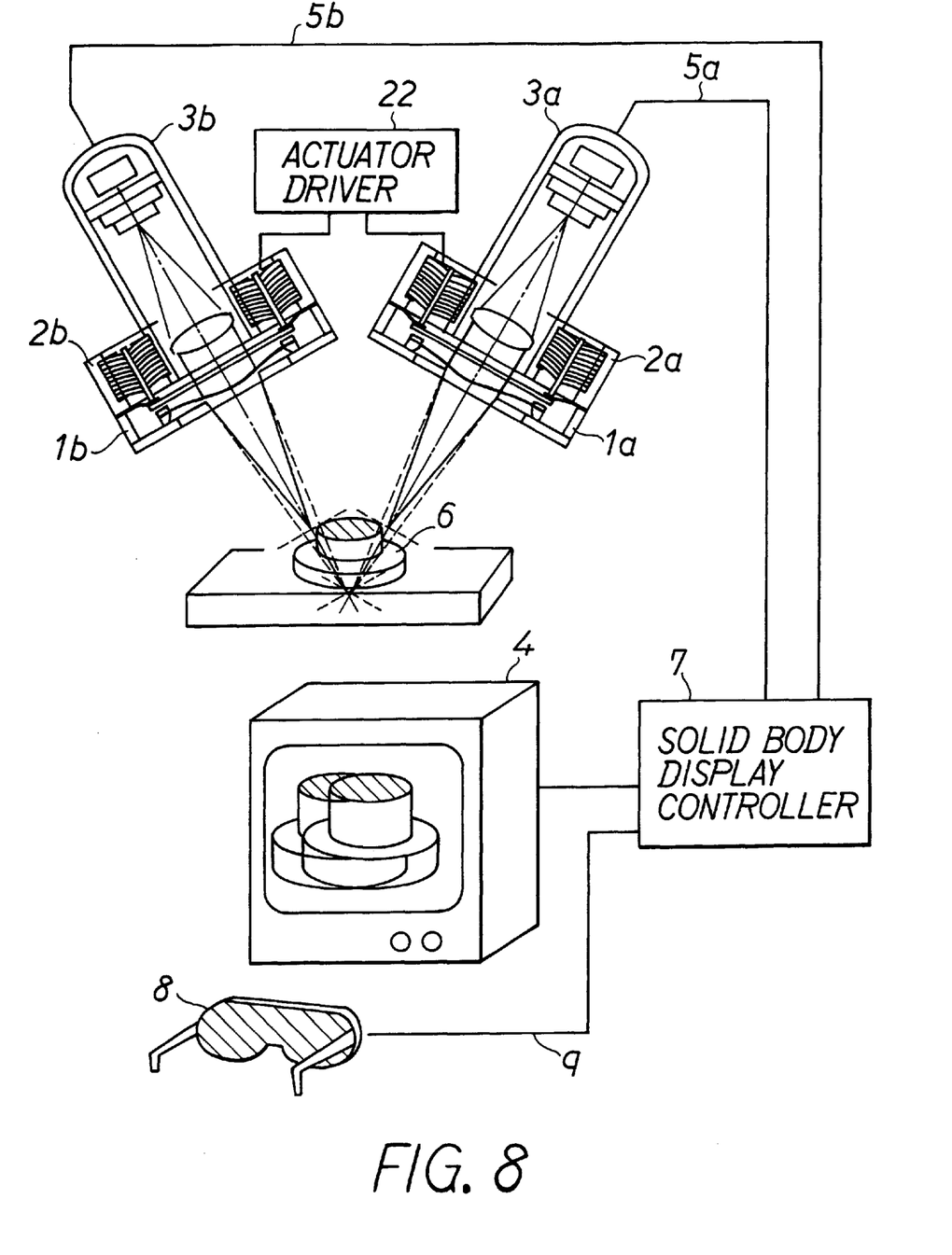
FIG. 8 shows a camera apparatus capable of displaying stereoscopic images as a second preferred embodiment of the present invention.

A second preferred embodiment of the present invention employs two cameras according to the foregoing first embodiment to display stereoscopic images for the viewer. In this embodiment, two cameras respectively disposed on the left and right create a parallax angle akin to human vision with respect to the object 6. The respective video signals output from the two cameras are input to a stereoscopic display controller 7. This stereoscopic display controller 7 displays the signals obtained from the two laterally arranged cameras on the television monitor 4 in alternation at a video rate with a frequency of 30 Hz or more.

Furthermore, the stereoscopic display controller 7 outputs to a goggles device 8 a signal informing a user whether the signal displayed on the television monitor 4 is from the left-hand or right-hand camera, and the goggles 8 control the television monitor 4 images entering the left and right eyes of the view with two liquid crystal shutters (one each on the left and right). Based on the signals coming from the stereoscopic display controller 7, the liquid crystal shutters for the left and right eyes are opened and closed in synchronization with the images displayed on the television monitor 4. By using a stereoscopic camera device such as this, the viewer watches images acquired by the right-hand camera with the right eye and images acquired by the left-hand camera with the left eye, and it becomes possible to see a stereoscopic image wherein all locations of the object 6 are in focus.

With this embodiment, a cable 9 is used to connect the stereoscopic display controller 7 and the goggles device 8, but it is possible also to transmit the timings for opening and closing the liquid crystal shutters using a wireless device employing infrared or radio waves. Additionally, it is possible for this stereoscopic display to employ a head-mounted display wherein two small television monitors are incorporated within the goggles and the images of the left- and right-hand cameras are respectively displayed on the television monitors to enable the viewer to view stereoscopic images.

According to the foregoing, it is possible for the variable focus lens of the camera apparatus of this invention to change optical characteristics greatly by varying the lens shape, and there is no need to move the position of the lens itself for focusing, as with lenses of the prior art.

Accordingly, in such a camera, when an object-side focal plane of an objective lens oscillates faster than approximately 60 Hz, the frequency at which persistence of vision occurs in human vision, portions of the object which are in focus have high image contrast and tend to remain in vision as latent images, whereas portions not in focus have low image contrast and tend not to remain in vision as latent images. Therefore, only the portions in focus overlap as latent images, and overall the viewer can perceive images in which all locations are in focus.

Moreover, by oscillating the object-side focal plane of the objective lens at a cycle shorter than the cycle in which the image pickup element reads an image signal corresponding to one pixel, a latent image effect is produced in the pickup element, and an overlapping, in-focus image of the respective positions of the object is picked up. When this image is displayed on a television monitor, the viewer can obtain an image in which the entirety of the object is in focus due to differences in contrast between portions of the object in focus and portions out of focus.

Figure 9:
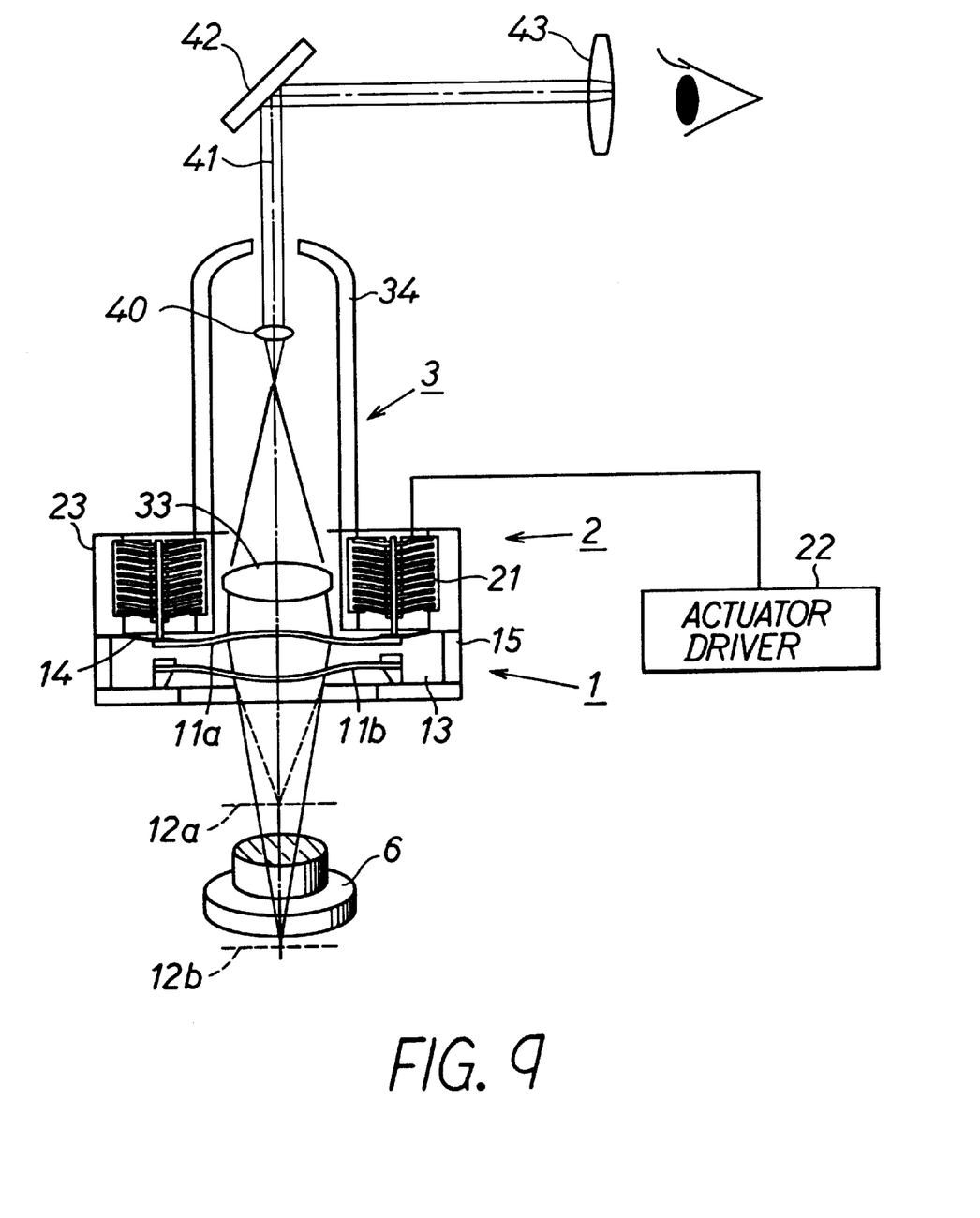
FIG. 9 shows a third preferred embodiment of the present invention.

FIG. 9 shows a third preferred embodiment of the present invention, in which the CCD camera 3 is eliminated and the system is used as a microscope for allowing a user to directly view the image formed by the lens system. Here, a lens barrel 34 has a convex lens 40 for collimating light from a fixed lens 33, a mirror 42 for reflecting the light from the convex lens 40, and an eyepiece lens for focusing light from the mirror 40.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An optical imaging device comprising:

an objective lens for variably focusing and condensing an image on an optical light path, said objective lens including a housing, a first transparent film and a second transparent elastic film disposed on said housing and a clear liquid disposed between said first and second films;

driving means for applying a periodic force to said second transparent film to change a radius of curvature of said second transparent film, thereby changing a focal length of said objective lens, said driving means comprising a plurality of laminated piezoelectric elements each communicating with said second transparent film to change the radius of curvature of said second transparent film;

an image sensor for converting an image formed by said objective lens to electrical signals; and a display for displaying an image corresponding to said electrical signals whereby an image having a portion of high contrast is generated based on a plurality of images obtained by changing said focal length of said objective lens;

wherein said driving means is for driving said second transparent film at a frequency shorter than a frequency in which pixels of said image sensor can be read, thereby generating an in focus latent image effect in pixels of said image sensor.

2. The system of claim 1, wherein said first and second transparent films each have a predetermined thickness profile.

3. The system of claim 1, wherein said driving means is for driving said second transparent film to cyclically vary an object-side focal plane of said objective lens, thereby enlarging a depth of focus of said objective lens.

4. The system of claim 1, further comprising:

an optical system for conveying an image from said objective lens to an eyepiece for viewing by a user.

5. The system of claim 1, wherein said driving means comprises:

a compressing drive portion including a thin elastic plate joined thereto and made up of said plurality of laminated piezoelectric elements;

a shaft fixed to said compressing drive portion to selectively push and pull said second transparent elastic film responsive to displacement of said compressing drive portion; and a drive controlling portion for applying a voltage having a predetermined frequency to said compressing drive portion.

6. The system of claim 1, wherein said driving means comprises:

a compressing drive portion including said plurality of laminated piezoelectric elements and joined to said second transparent elastic film; and a drive controlling portion for applying a voltage having a predetermined cycle to said compressing drive portion.

7. The system of claim 1, wherein:

said objective lens and said driving means are part of a first camera unit;

said device includes a second camera unit, said first and second camera units being placed at a given parallax angle relative to an object to be imaged.

8. The system of claim 7, wherein said parallax angle is a parallax angle of human eyes.

9. The system of claim 7, wherein:

each of said first and second camera units includes an objective lens, and an image sensor for converting an image from the objective lens into electrical signals; and said device includes a display unit for displaying images based on said electrical signals from said image sensors as stereoscopic images.

10. The system of claim 9, wherein said display unit includes goggles for selectively providing images corresponding to said image sensors to respective eyes of a user.

11. The system of claim 10, wherein:

said display unit further comprises a display screen; and said goggles include a shutter for selectively opening and closing corresponding to an image sensor on which a currently displayed image is based.

12. The system of claim 10, wherein:

said goggles include two display screens, each of said display screens being for displaying images based on a respective one of said image sensors.

13. An optical imaging device comprising:

an objective lens for variably focusing and condensing an image on an optical light path, said objective lens including a housing, a first transparent film and a second transparent elastic film disposed on said housing, and a clear liquid disposed between said first and second films; and driving means for applying a periodic force to said second transparent film to change a radius of curvature of said second transparent film, thereby changing a focal length of said objective lens;

whereby an image having a portion of high contrast is generated based on a plurality of images obtained by changing said focal length of said objective lens;

wherein said driving means is for driving said objective lens with a period shorter than a period in which pixels of an image sensor can be read, thereby generating an in-focus latent image effect in pixels of said image sensor.

* * * * *

UNITED STATES PATENT AND TRADEMARK OFFICE
CERTIFICATE OF CORRECTION

PATENT NO. : 5,917,657
DATED : June 29, 1999
INVENTOR(S) : KANEKO et al.

It is certified that error appears in the above-indentified patent and that said Letters Patent is hereby corrected as shown below:

On the title page:

Please add:

--[73] Assignee: DENSO Corporation, Kariya-city, Japan--

Signed and Sealed this

Sixth Day of March, 2001

*Attest:*

NICHOLAS P. GODICI

*Attesting Officer*   Acting Director of the United States Patent and Trademark Office